United States Patent
Rollen et al.

[15] 3,648,146
[45] Mar. 7, 1972

[54] ALTERNATOR CIRCUIT PROTECTOR

[72] Inventors: Wayne N. Rollen; Larry J. Strong; Hurschel H. Rolen, all of 801 East Baker Street, Plant City, Fla. 33566

[22] Filed: Mar. 20, 1970

[21] Appl. No.: 21,233

[52] U.S. Cl. .......................................... 320/25, 307/10 BP
[51] Int. Cl. ................................................. H02j 7/00
[58] Field of Search ........... 320/25, 26; 307/127, 138, 10 BP, 307/10 R

[56] References Cited

UNITED STATES PATENTS

| | | |
|---|---|---|
| 3,219,903 | 11/1965 | Larson ..................................... 320/25 |
| 3,300,702 | 1/1967 | Noddin .................................... 320/25 |
| 3,313,995 | 4/1967 | Bach ........................................ 320/25 |
| 3,398,347 | 8/1968 | Citro ........................................ 320/25 |

*Primary Examiner*—William M. Shoop, Jr.
*Assistant Examiner*—Harvey Fendelman
*Attorney*—Clarence A. O'Brien and Harvey B. Jacobson

[57] ABSTRACT

A relay assembly having a coil connected between the terminals of a vehicle battery. The switch contacts of the relay assembly complete a connection between one of the battery terminals and ground when the coil is energized in response to the closing of an ignition switch. A diode is connected in the coil circuit to prevent the connection of the battery to ground if the battery is connected with the wrong polarity.

8 Claims, 1 Drawing Figure

Patented March 7, 1972  3,648,146
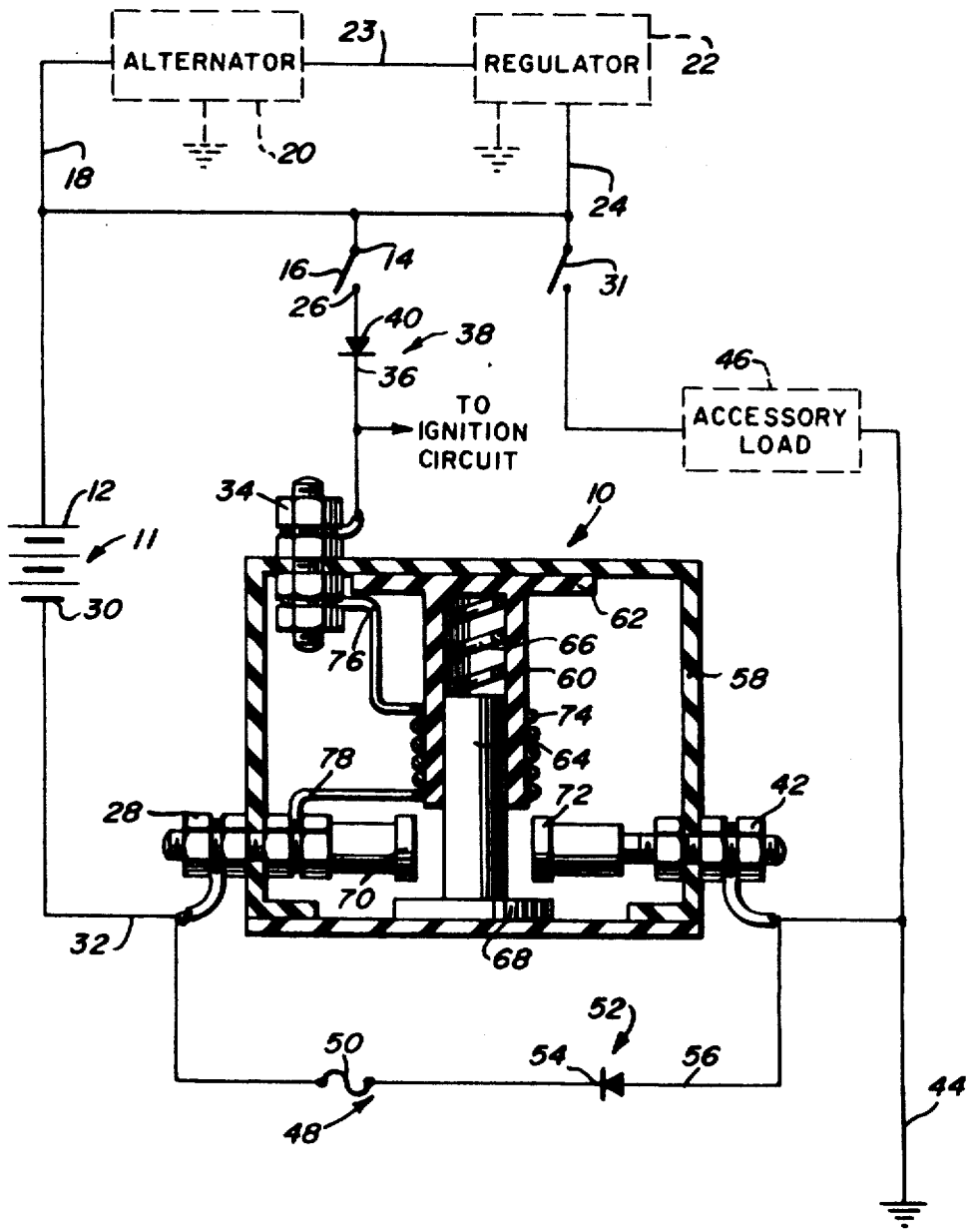
Wayne N. Rollen
Larry J. Strong
Hurschel H. Rolen
INVENTORS

ALTERNATOR CIRCUIT PROTECTOR

The present invention relates to a relay assembly for preventing damage to a vehicle alternator due to the connection of the battery in circuit with the wrong polarity.

In the wiring system of many conventional vehicles, there is an alternator which serves the purpose of recharging the vehicle battery. When the alternator is short circuited or destroyed by reverse polarity in the electrical system, it must be replaced at a considerable cost to the vehicle owner.

The present invention seeks to remedy this problem by placing a relay assembly in the electrical system. The assembly includes a coil which is connected in series with the battery and the ignition switch of a vehicle. In order to ensure that current will flow through the circuit only in response to a preselected polarity condition of the battery, a diode is also serially connected with the coil. During inoperativeness of the vehicle, the battery remains "floating" which means that it is not connected to ground. However, once the ignition switch is closed and the battery was placed in circuit with the preselected polarity, switch contacts in the relay assembly are closed to complete a connection between ground and the battery so the recharging circuit of the vehicle electrical system can operate as usual.

In order to permit use of vehicle electrical accessories, a bypass circuit branch is connected across the relay assembly. The circuit branch also includes a diode for conducting ground current through a circuit breaker protecting solid-state accessories against excessive current at all times as well as polarity reversal.

A holding voltage must be applied to the coil in order to retain connection between the battery and ground. Therefore, should a short develop in the wiring harness, the holding voltage will not be generated and the battery will be disconnected from ground. This monitoring or detecting function serves to protect the electrical wiring from burning due to a short in the harness. The present invention is inexpensive to fabricate and is simply installed in the main ground circuit of the vehicle electrical system.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

The FIGURE is a cross-sectional view illustrating the component parts of a relay with the connected electrical circuit shown schematically.

Referring to the drawing, the present relay assembly generally indicated by reference numeral 10 serves to isolate a vehicle battery 11 from system ground until proper polarity of the battery is established in the circuit and the vehicle ignition switch is turned on.

In the electrical circuit connected to the relay assembly 10, it will be noted that a negative ground system is indicated. However, if a positive grounded system is to be employed, the principles of the present invention apply equally well, requiring only the changing of biasing of certain electrical components as will become evident hereinafter.

The positive terminal 12 of battery 11 is serially connected to a selector contact 14 of ignition switch 16. In a conventional electrical system, this switch contact is connected to a grounded alternator 20 through a connecting lead 18. A grounded regulator 22 is connected to the alternator 20 through connecting lead 23 and serves to regulate the output DC voltage of the alternator. A connecting lead 24 extends between the regulator and the contact 14 of ignition 16.

A first terminal or binding post 28 extends outwardly from the relay assembly 10 and serves to mount a lead 32 connected to the negative terminal 30 of battery 11. The terminal 28 is a first input terminal which electrically cooperates with a second input terminal 34, likewise extending outwardly from the relay assembly 10. The second terminal 34 is directly connected to the cathode 36 of a semiconductor diode 38. The anode 40 of the diode is directly connected to the fixed contact 26 of ignition switch 16. Thus, with the ignition switch 16 closed, and with the polarity of battery 11 connected in circuit as shown, current will be caused to flow from the battery through the series circuit including the ignition switch 16, the diode 38, and the input terminals 28 and 34 of the relay assembly 10. Once this electrical condition exists, the relay assembly 10 becomes actuated causing an internal connection between input terminal 28 and an output terminal 42 directly connected to ground 44. Thus, the input terminals of the relay assembly operate independently of the system ground and when the relay assembly becomes actuated, the battery 11 ceases to be "floating" and the negative terminal 30 of the battery is directly connected to ground. The internal relay components for achieving this actuation and ground connection will be discussed hereinafter.

Often, it is necessary or desirable to have the electrical accessories of a vehicle operating by closing the accessory switch 31 while the remaining electrical system is turned off. In order to achieve this end with the present invention, ground for the accessory load 46 is connected by a bypass circuit branch 48 across the input terminal 28 and the output terminal 42 of the relay assembly 10 to the negative terminal 30 of the battery. This bypass branch includes a circuit breaker or fuse 50 serially connected to the cathode 54 of a diode 52. The anode 56 of the diode is directly connected to the output terminal 42 of the relay assembly 10. Utilization of diode 52 guarantees that the accessories will not be connected to ground unless proper polarity exists. This is particularly important for those electrical accessories utilizing solid-state components extremely sensitive to reverse battery polarity. Inclusion of circuit breaker fuse 50 limits directionally correct current flow to the accessories thereby preventing accessory burnout under all conditions.

As to the mechanical aspects of the relay assembly 10, reference numeral 58 denotes a boxlike housing of insulating material which encloses the component portions of the relay assembly. A hollowed cylindrical member 60 is mounted at one end thereof to the interior surface of a housing wall by means of an integrally formed base 62 at the upper end of the cylindrical body as viewed in the figure. The opposite end of the cylindrical body is opened and receives the cylindrical portion of a plunger 64. The cylindrical body 60 is made from an insulating material and serves as a journal or guide for plunger 64 which is fabricated from a ferromagnetic material. A coil spring 66 is located in the interior space of the cylindrical body 60 and normally urges the inward end of plunger 64 outwardly so that approximately one-half the length of the plunger remains journaled in the cylindrical body 60. The outward end of plunger 64 terminates in a disclike contact 68 integrally connected to the cylindrical main body of the plunger. The length of the cylindrical plunger body is such that the disc contact 68 abuts a confronting wall of the housing due to the biasing effect of the coil spring 66. The input terminal 28 extends inwardly to a cylindrical contact 70 generally resembling the contact portion of plunger 64. The disc portion of contact 70 is disposed above the disc portion 68 of plunger 64. Likewise, the output terminal 42 includes a contact 72 extending inwardly in aligned confronting relation with the contact 70 so that when the disc portion 68 of plunger 64 is moved upwardly, an electrical connection is made between the contacts 70 and 72 via contact 68.

In order to effect this upward displacement of contact 68 and its attached plunger 64, a coil 74 is wrapped around the lower end portion of the cylindrical body 60. The coil 74 is positioned in outward concentric relation to the inward end portion of plunger 64 so that maximum magnetic linkage between the coil and the plunger is effected. A first end of coil 74 is indicated by 76 and is seen to be internally connected to the input terminal 34. The opposite end 78 of the coil is internally connected to the other input terminal 28. Thus, the input terminals 28 and 34 form terminals for the coil 74 which is energized when the ignition switch 16 is closed. Energization of the coil causes upper axial displacement of plunger 64 until the aforementioned connection between the contacts 68, 70 and 72 is effected. Once this contact is made, the negative terminal 30 of battery 11 is directly grounded in bypass relation to diode 52. Likewise, actuation of the relay causes direct grounding of the accessory load 46.

During normal operation of a vehicle, a circuit is completed between the battery 11 and ground 44 so that the battery may undergo charging by alternator 20. When the ignition switch 16 is opened after motor shutdown, coil 74 is deenergized to open the switch contacts 68, 70 and 72 whereby the negative terminal 30 of battery 11 becomes isolated from ground by the diode 52. Of course, at a subsequent time, when the ignition switch 16 is again closed, the operation of the relay assembly is repeated as hereinbefore described. If the battery were connected with its terminals reversed, diode 40 would block flow of energizing current to the coil 74 of relay assembly 10 to prevent grounding of the battery and hold the ignition circuit open to prevent engine operation. The accessory load would be protected by the diode 52.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a charging circuit and a grounded load adapted to be connected to one terminal of a DC source of potential having another terminal, protection means for the charging circuit and the load comprising ground circuit means adapted to be connected to said other terminal of the source for limiting flow of ground current to maintain the source in a substantially floating condition, polarity sensing means connected to the load for detecting flow of current thereto in one direction, and switch means operatively connected to the polarity sensing means for shunting said ground circuit means to ground the source at said other terminal.

2. The combination of claim 1 wherein said ground circuit means includes a diode and a fuse connected in series between said other terminal and ground.

3. The combination of claim 2 wherein the polarity sensing means comprises a current responsive holding coil and a unidirectional current conducting device connected in series across said terminals of the source, said coil when energized holding the switch means closed.

4. The combination of claim 3 wherein said load is an ignition circuit connected to the polarity sensing means and an ignition switch connecting the sensing means to said one terminal of the source.

5. The combination of claim 5 including a grounded accessory load connected to said ignition switch.

6. The combination of claim 1 wherein the polarity sensing means comprises a current responsive holding coil and a unidirectional current conducting device connected in series across said terminals of the source, said coil when energized holding the switch means closed.

7. The combination of claim 1 wherein said load is an ignition circuit connected to the polarity sensing means and an ignition switch connecting the sensing means to said one terminal of the source.

8. The combination of claim 7 including a grounded accessory load connected to said ignition switch.

* * * * *